Dec. 5, 1961     I. J. HEINEN     3,011,513
TAPERED PLUG VALVE
Filed Sept. 1, 1959     2 Sheets-Sheet 1

IRVING JOSEPH HEINEN,
INVENTOR.
WHANN & McMANIGAL
Attorneys for Applicant by Robert M. McManigal Dec. 5, 1961   I. J. HEINEN   3,011,513
TAPERED PLUG VALVE
Filed Sept. 1, 1959   2 Sheets-Sheet 2
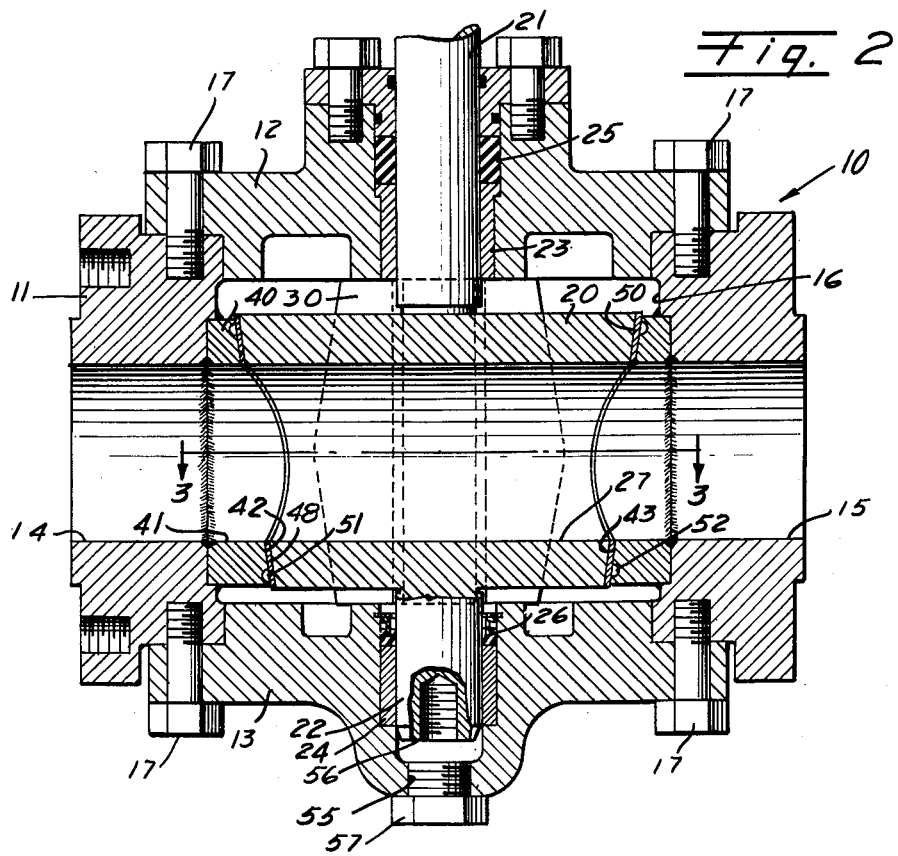
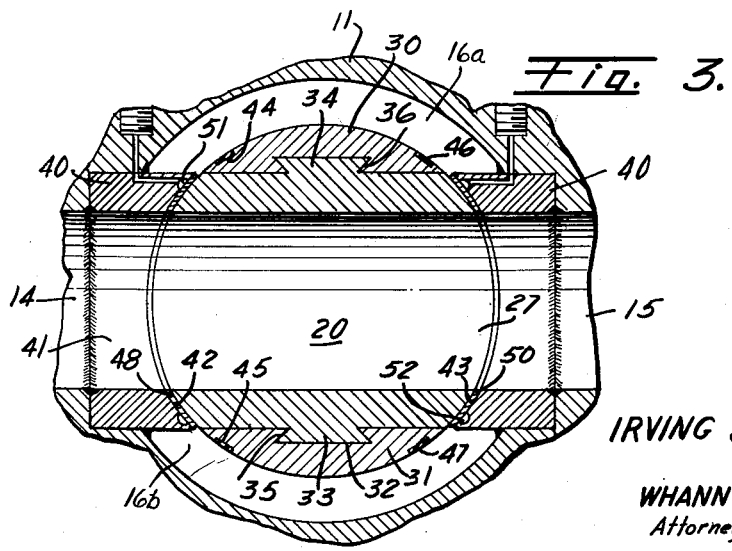
IRVING JOSEPH HEINEN,
INVENTOR.
WHANN & McMANIGAL
Attorneys for Applicant
by Robert M. McManigal

# United States Patent Office 3,011,513
Patented Dec. 5, 1961

3,011,513
TAPERED PLUG VALVE
Irving Joseph Heinen, 4206 Fleet Haven Road,
Lakewood Estates, Long Beach, Calif.
Filed Sept. 1, 1959, Ser. No. 837,546
4 Claims. (Cl. 137—246)

This invention relates to valves of the plug type and has for its object the provision of a new and improved plug valve so constructed and arranged to include means permitting the valve to be repaired, or parts thereof replaced, while in operation.

More specifically, it is a principal object of this invention to provide a new and improved plug type valve with a means of repairing and replacing sealing wedges or "slips" when the valve is in its open position.

The type of valve to which this invention pertains is sometimes called a "non-lubricated" valve, and includes a valve body which is provided with a pair of parallel or coaxial ports which are connected to an incoming and outgoing line for the movement of fluid under pressure therethrough. Located centrally of the valve body there is provided a plug capable of rotating and moving transverse to the ports and which is provided with a pair of wedges or "slips" which, in turn, are arranged so that their outer surfaces can be moved inwardly to permit rotation of the plug and outwardly against the edges of the valve ports to provide a fluid-tight seal against the fluid in the ports.

The inward movement of the slips eliminates the need to lubricate the plug ports in order to turn or rotate the plug, hence the name "non-lubricated" as applied.

The movement inwardly and outwardly, as well as rotationally, to open and close the valve is accomplished by the aforesaid rotational and transverse movement of the valve plug which, in turn, is accomplished preferably by means such as exemplified in the U.S. patent to J. Heinen, No. 2,596,075, issued May 6, 1952, and in the U.S. patent to J. Heinen, et al., No. 2,795,960, issued June 18, 1957.

Originally it had been the practice to manufacture the plug wedge elements, or slips, valve body, etc. of these valves out of hard, long-lasting material, so that the valve could be permanently installed in a pressure line. The use of one type of hard material, however, has been found to be unsatisfactory since it was difficult to effect a very positive seal particularly when the valve was in its closed position. Recently, the trend in this type of valve has been to incorporate softer material in the wedge elements or slips to effect a more positive seal during the shutoff time when sealing is the most desirable and most important, making the slips themselves out of softer material, and/or introducing sealing rings of resilient material, such as synthetic rubber or Teflon or nylon, or the like, which form a resilient seat against the seat on the valve body itself. However, as can be appreciated, continued opening and closing of the valve causes wear on the softer material and/or on the resilient material, plus the natural tendency for such materials to deteriorate over a period of time, has caused the valve to lose its sealing ability.

I have found that I could improve such plug type valves by constructing and arranging the valve so that the slips or wedge elements could be removed and replaced or repaired while the valve was in its open position. In this manner any defective part could be replaced or repaired while pressure was still on the pressure line.

As mentioned before, this improvement constitutes the primary object of my present invention and is accomplished, in the embodiment illustrated, by providing the wedge elements and the plug with tapered outer surfaces adapted to cooperate with tapered mating seating surfaces in the valve body. The tapered outer surfaces of the wedge element, cooperating with the tapered mating surfaces in the valve body, provide a fluid-tight seal when the valve is in closed position, and the tapered surface on the plug provides a fluid-tight seal when the valve is open. As will be explained in more detail hereinafter, the wedging effect of the tapered outer surfaces of the wedging elements is such that the valve has a more effective seal and the life of the valve is materially increased. Also, when the valve is in its open position, the valve body is so constructed and arranged that the slips may be removed. Means may also be provided to permit the injection of grease between the mating surfaces of the plug and the valve body in accordance with the conventional practice.

Accordingly, a more specific object of my invention is the provision of a new and improved plug-type valve having a valve plug and wedge elements with tapered outer surfaces which cooperates with tapered mating surfaces on the valve body to provide fluid-tight seal in both open and closed position and which will permit the wedge elements to be removed for repair or replacement while pressure is in the line in which the valve is connected.

Still another object of my invention is the provision of a valve with a plug and resilient seating surface on the wedge elements which cooperate with tapered mating surfaces on the valve body and which is provided with means permitting the injection of grease in between the surface of the plug and their seats to provide absolute fluid-tight seal so that portions of the valve body may be opened for repair and/or replacement of the wedges.

Other and additional objects of my invention will be apparent to those skilled in the art from the following description when taken in connection with the accompanying drawings in which:

FIG. 2 is a cross-sectional view illustrating to advantage the wedge elements of the valve illustrated in FIG. 1 when the valve is in open position; and FIG. 3 is a partial cross-sectional view taken along line 3—3 of FIG. 1 and looking in the direction of the arrows.

Figure 1:
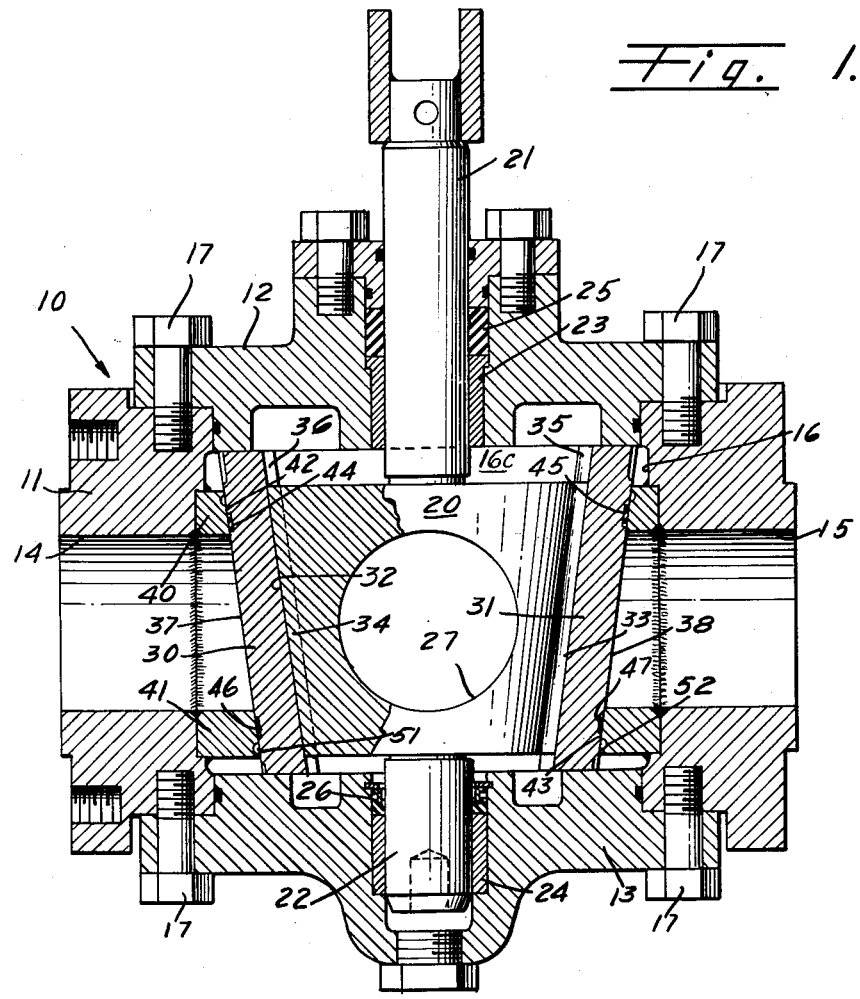
FIG. 1 is an elevational cross-sectional view illustrating to advantage the tapered wedge elements cooperating with their tapered mating valve seats when the valve is in closed position.

Referring now to the drawings, it can be seen that my invention comprises a valve having a valve body, indicated in its entirety as 10, and comprising a central or main body portion 11, a top plate portion 12 and a lower plate portion 13. The main body portion 11 is provided with two ports or passages 14 and 15, both of which intersect a centrally located valve chamber 16 substantially transverse of the two port passages 14 and 15. Side portions 16a and 16b of valve chamber 16 define recesses disposed respectively on opposite sides of the central valve bore 16c. In the embodiment illustrated, the top plate 12 forms the top limitation of the valve chamber 16 and serves to close the valve chamber, and the bottom plate 13 also forms the lower limitation and serves to close the valve chamber 16. Suitable means are provided for affixing the top plate and the bottom plate to the main body portion, such as bolt means 17 (4 shown).

A centrally located plug 20 is disposed within the valve chamber 16 and is provided with an upwardly extending shaft or trunnion 21 which extends through the upper plate 12 and a downwardly extending shaft or trunnion 22 which is received and terminates within the bottom plate 13. Suitable bearing means and sealing means, such as bearing means 23 and 24 and sealing means 25 and 26, are provided about the trunnion 22 to support the trunnions and prevent leakage.

The depending circular portion of the plate 13 is provided with a tapped opening 55 therein in which is disposed a screw 57 to normally seal said opening. The screw 57 is adapted to be removed for insertion of a locking screw as hereinafter described. The lower end of the trunnion 22 is provided with an upwardly extending tapped bore 56 of smaller diameter than the bore 55, said bores 55 and 56 being axially aligned.

Plug 20 is provided with a centrally located bore 27 of substantially the same diameter as the bores 14 and 15 and adapted to be aligned coaxially with the latter when the plug 20 is in its lowermost or valve open position to provide a free passage for the flow of fluid through the bores 14, 27 and 15, as will be apparent from a study of FIG. 2. A pair of arcuate and tapered wedge elements or slips 30 and 31 are positioned within the bore 16 so as to extend the full length of the chamber 16 so as to engage the top plate 12 and the bottom plate 13 to prevent their transverse or upward or downward movement. The plug 20, being centrally located of the wedge elements 30 and 31, is somewhat shorter so that it can be moved vertically and is also provided with an outer tapered surface 32 upon which are formed a pair of oppositely outwardly extending tongue elements 33 and 34 (FIG. 3) which dovetail with a pair of interlocking dovetail grooves 35 and 36 on the wedge elements 30 and 31 to form interlocking joints with tongue elements 33, 34. Since these interlocking dovetail joints are tapered, as more clearly seen in FIG. 1, upward and downward movement by the relatively shorter plug 20 in the valve chamber 16 will serve to move the wedge elements 30 and 31 inwardly and outwardly. Thus, upward and downward movement of the plug 20 within the chamber 16 will serve to seat and reseat the wedge elements against a valve seat and define the valve closed position.

The wedge elements 30 and 31 are provided with tapered outer surfaces 37 and 38, which in the embodiment illustrated, have the same taper as the taper of the plug 20, and cooperate with an annular sleeve member 40 which is centrally bored, as at 41, to provide the continuation of the bores 14 and 15 and which is provided with seats 42 and 43 for the tapered outer surfaces 37 and 38 as they are wedged into engagement therewith. Thus, if the valve is in closed position and the plug 20 is raised, the wedges 30 and 31 move inwardly with no upward movement so as to clear the valve seats 42 and 43 without scoring or galling of the valve seats and, since they are free and clear of the valve seats, the plug 20 and the wedges 30 and 31 may also be rotated free and clear of their seats 42 and 43 without galling or scoring. Upon a turn of 90° the plug 20 may then move downwardly so that the outer surfaces of the plug are urged against their respective valve seats so that the passage 27 may be suitably aligned with the passages 14 and 15 and properly sealed, as more clearly shown in FIG. 2.

Mechanisms to accomplish the upward and downward and rotational movement of the plug are preferably accomplished by those described and claimed in the U.S. Patents to J. Heinen, and J. Heinen et al., above identified.

As previously mentioned, recent developments have indicated that it is most desirable to have the wedge elements comprise softer material than the valve body so that, in the valve closed position, the wedging of the softer material against the harder material increases the sealing effect of the wedges against the valve seats. As such, the wedge may include sealing means of resilient material such as synthetic or natural rubber, Teflon or nylon, or some other synthetic material, which of course in time will deteriorate and will lose its resilient properties. Thus, it is desirable to replace the softer resilient material and it is most desirable that this replacement be done while the valve remains in the line, so that the line does not have to be shut down in any manner. The repair and replacement of the wedges or slips is one of the outstanding features of my invention, and will now be described in detail.

As can be seen in the drawings (FIGS. 1 and 3) the wedges 30 and 31 are provided with grooves 44 and 45 in which is disposed circular or ring seals 46 and 47 which, when urged against the seats 42 and 43, form a fluid-tight sealing arrangement. These seals 46 and 47, forming an integral part of the wedges 30 and 31 will naturally move along with the movement of the wedges and may be displaced into recesses 16a and 16b with their outer tapered surfaces free and clear of the valve seats as shown in FIG. 3.

As can be appreciated from FIGS. 2 and 3, the wedges 30 and 31, being free and clear of the valve seats, may be removed by the removal of the upper plate 12 or lower plate 13, so that the resilient rings may be replaced or substantially identical slips 30 and 31 may be inserted in the dovetail joint arrangement of the plug.

Since it may be desirable in certain applications of my invention, I have also provided my plug with liners, such as 48 and 50, which abut against the valve seats 42 and 43 when the valve is in open position. Also conventional grease pockets 51 and 52 may be provided in the valve seats so that grease may be interjected between the liners and their respective valve seats to insure proper sealing in the use of certain types of fluid. This conventional grease insertion is usually completed prior to the removal of the top plate 12 or the bottom plate 13 to insure against leakage.

Figure 1A:
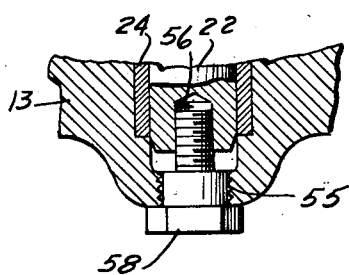
FIG. 1A is a fragmentary sectional view showing the locking arrangement to hold the plug in position when the valve is opened from the top.

Referring to FIG. 1A the device is shown with means for securing the plug in position when it is desired to remove the slips or wedge elements from the top. This locking means comprises a screw 58 which is disposed in the tapped opening 55 after the screw 57 has been removed, screw 58 being provided with an externally threaded reduced diameter end portion which is screwed into a tapped opening of the trunnion 22. In order to use the screw 58, the screw 57 must, of course, be first removed. In removing the wedge element, the top plate 12 is removed after the screw 58 secures the lower end of the plug.

It can be seen from the above description, that I have provided a plug valve with a wedging action of the wedge elements against the valve seats when the valve is in closed position, and which, when the valve is in open position the wedging elements may be easily removed for repair and replacement parts.

While the various parts herein have been described as in an upper or lower position or in a right or left position or in an inward or outward position, such description refers only to the relative position of the parts as shown in the drawings, and is not intended to be a limitation of the invention; it being understood that the appended claims should be construed as broadly as the prior art will permit.

I claim:

1. In a plug valve including a valve body having a bore therein, a pair of oppositely arranged fluid ports terminating at said bore, a plug mounted in said bore, a pair of wedges on said plug, said plug and wedges having inclined surfaces and tongue and groove connections therebetween whereby movement of said plug in one direction moves said wedges toward one another and movement in the opposite direction moves said wedges away from one another, said plug having a fluid passage extending therethrough between said wedges so that when aligned with said fluid ports fluid may flow through said valve, said wedges further preventing the flow of fluid through said valve when the fluid passage is misaligned with said fluid port, the improvement comprising: tapered surfaces on said bore intersected by said fluid ports, outer tapered surfaces on said wedges for mating with said tapered surfaces on said bore to seal said bore ports, a pair of recesses in said valve body disposed respectively on opposite sides of said bore whereby, with said plug rotated to align said plug carried fluid passage and said valve body fluid ports, each of said plug carried wedges is disposed in a recess with its outer tapered surface spaced from said valve body, and separable valve body parts providing access to said recesses whereby said wedges may be removed therefrom.

2. The invention according to claim 1 including means for securing the plug at the lower end to prevent displacement of said plug when removing wedges from the upper end of the valve body.

3. The invention according to claim 1 in which said wedges extend beyond the upper end of said plug to facilitate their removal from said valve body.

4. The valve claimed in claim 1 wherein means are provided to permit sealing means to be inserted between said tapered surfaces.

References Cited in the file of this patent

UNITED STATES PATENTS

| | | |
|---|---|---|
| 305,078 | Homan | Sept. 16, 1884 |
| 671,443 | Jennings | Apr. 9, 1901 |
| 2,144,305 | Brisbane | Jan. 17, 1939 |
| 2,376,975 | Morgan | May 29, 1945 |
| 2,408,223 | Nash | Sept. 24, 1946 |
| 2,596,075 | Heinen | May 6, 1952 |
| 2,612,340 | Laurent | Sept. 30, 1952 |

FOREIGN PATENTS

| | | |
|---|---|---|
| 730,366 | Great Britain | May 18, 1955 |